June 21, 1966 S. S. CANNADAY 3,257,245
WIRE COATING APPARATUS
Filed Aug. 1, 1960 3 Sheets-Sheet 1
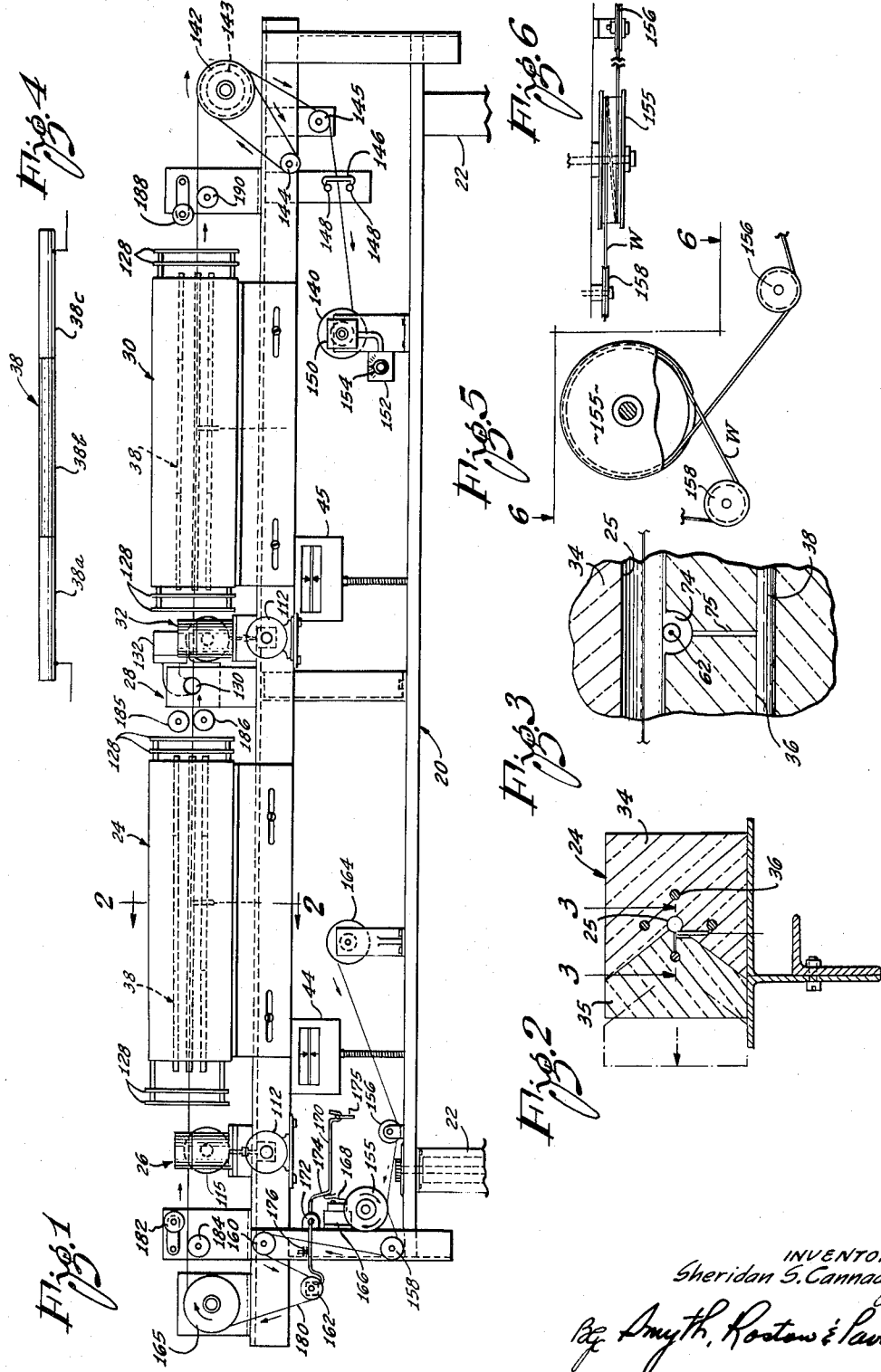
INVENTOR:
Sheridan S. Cannaday
By Smyth, Roston & Pavitt
Attorneys.

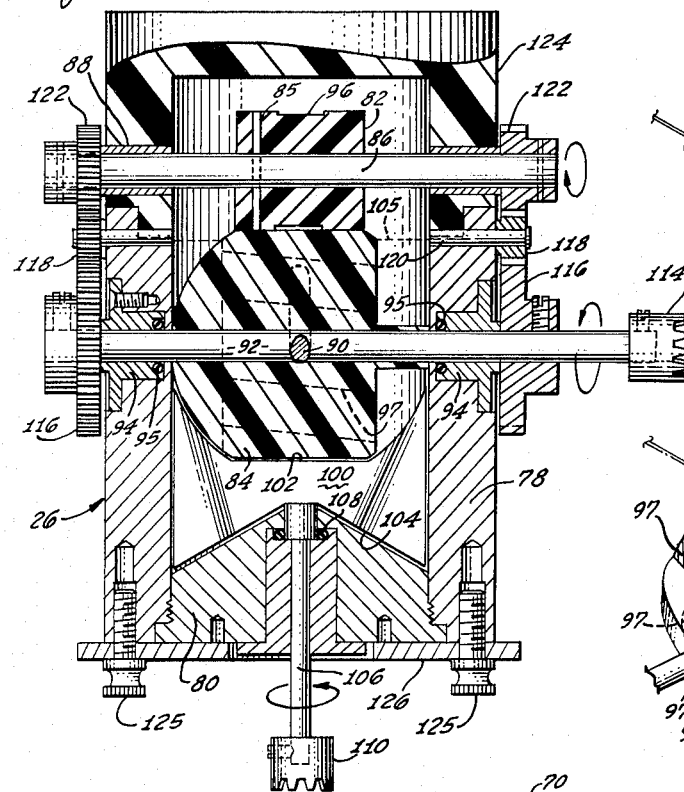
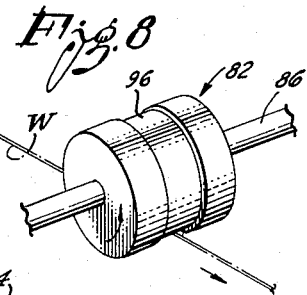
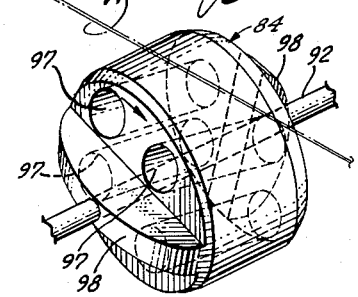
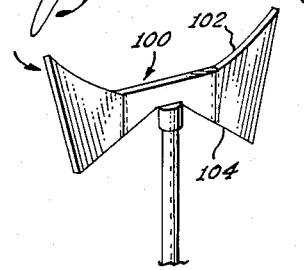
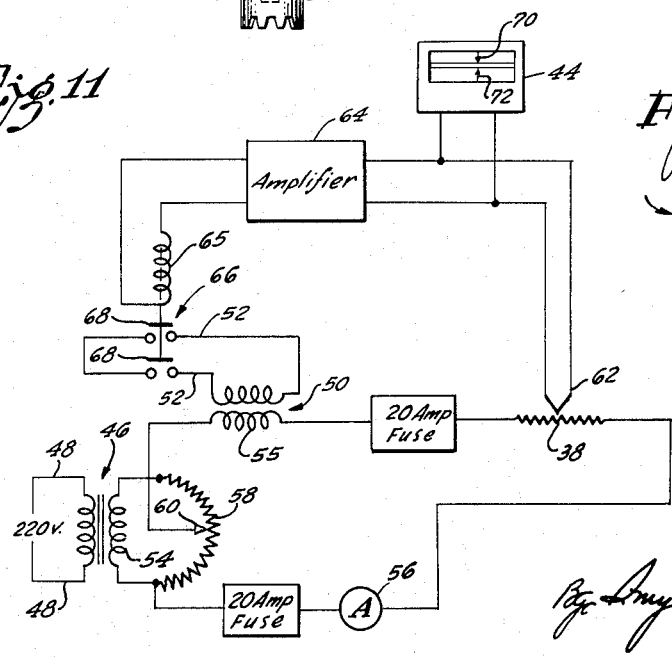

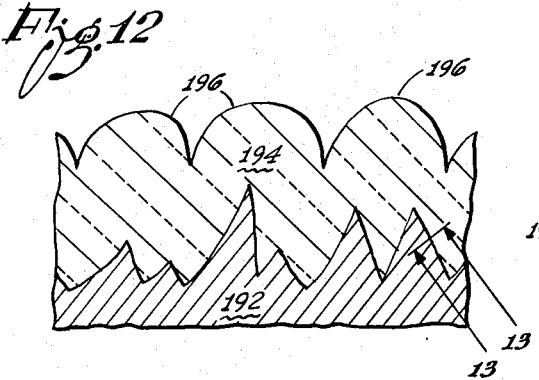
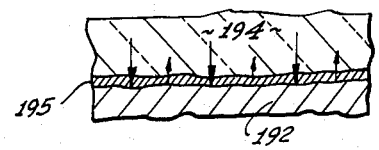
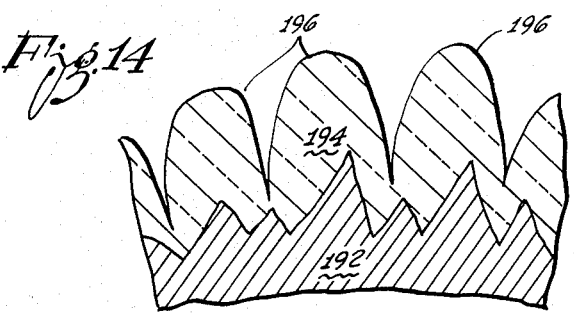
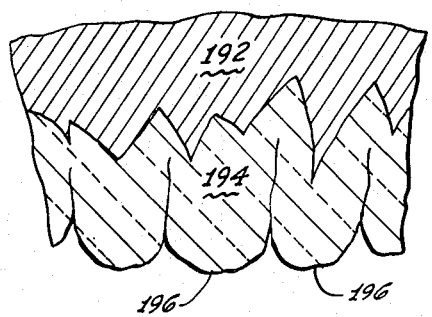

United States Patent Office 3,257,245
Patented June 21, 1966

3,257,245
WIRE COATING APPARATUS
Sheridan S. Cannaday, Pasadena, Calif., assignor, by mesne assignments, to Physical Sciences Corporation, a corporation of California
Filed Aug. 1, 1960, Ser. No. 46,576
12 Claims. (Cl. 148—6.3)

This invention relates to a method of covering a metal body with a ceramic coating. While the invention is broadly applicable for its purposes, it has special utility for forming a ceramic-coating that will withstand flexure of the body, for example, a ceramic coating on a flexible wire.

For the purpose of disclosure, the invention is described herein as directed to the production of a ceramic-coated wire for use in electrical circuits. This description will provide adequate guidance for application of the invention to other specific purposes.

A ceramic-coated electrical conductor is highly advantageous for its ability to withstand high temperatures. The usual ceramic coating, however, will not withstand prolonged exposure to radiation from a nuclear reactor without deterioration of its mechanical and electrical properties. In this regard, a special feature of the invention is the provision of a ceramic coating that is capable of prolonged service under particle bombardment.

The invention is based on certain discoveries which are vital for the production of a ceramic-coated wire for use in electrical devices. One discovery is that a ceramic coating of a suitable commposition may be tenaciously bonded to a metal that is capable of forming a tenaciously adherent oxide film by oxidation, a chemical bond being achieved by fusing the ceramic material to the oxide film. Aluminum and nickel are two metals that form such a film. A mechanical bond, in addition to the chemical bond, may be obtained by using a ceramic material that has a smaller coefficient of thermal expansion than the metal of the wire. The mechanical bond is caused by thermal contraction of the metal into interlocking engagement with the minute portions of the ceramic that extend into the minute surface recesses of the metal. The combination of the chemical bond of the ceramic with the oxide film and the mechanical bond by thermal contraction results in tenacious adherence of the ceramic to the metal wire.

The second discovery is that a ceramic coating of a suitable composition applied to the surface of a metal wire may be heated briefly to a temperature that will result in a minutely knobby surface texture. Under a microscope the surface seems to comprise numerous contiguous nodules of convex or bulbous configuration. Ordinarily, a ceramic or glasslike layer on a metal wire will shatter if the wire is bent. The advantage of the nodular surface configuration, however, is that when the metal to which the ceramic is bonded is bent or flexed, fractures occur in generally radial directions at the junctures of the nodules. Thus, when a wire covered with a ceramic of this character is bent to a small radius the minute nodules on the outside of the bend fan out substantially radially of the curvature of the wire. At the same time the nodules on the inner side of the bend crowd together.

A third discovery is that, fortuitously, the temperature and the duration of a heating operation may be selected to cause both of these effects to occur simultaneously. Thus, a metal wire may be moved longitudinally through a heating zone for fusing of the ceramic to the oxide film and simultaneous formation of the required nodular surface configuration. A person skilled in the art may easily carry out a simple trial and error procedure for finding an operative combination of rate of wire travel, length of the heating zone, and temperature of the heating zone. The temperature required is usually relatively high. In some instances the temperature is higher than the melting point of the wire, but the duration of the exposure to the heat is too short for the metal of the wire to be heated to its melting point.

In the preferred practice of the invention the wire travels at a constant rate through five successive zones in sequence. In the first zone the wire is coated with a liquid suspension of finely divided ceramic material; the second zone is a heating zone in which the ceramic coating is fired; in the third zone the wire is cooled in preparation for repeating the first two steps; in the fourth zone the wire is coated a second time with the liquid suspension; and in the fifth zone the newly added ceramic is fired to add to the thickness of the ceramic layer.

Two serious problems arise in carrying out this process. The first problem is to keep the temperatures in the two heating zones within a narrow operating range. The second problem arises from the fact that softening of the wire by the high temperature makes the wire prone to stretch in response to even an exceedingly low tension force. The second problem is to propel the wire through the two heating zones without placing the wire under any significant degree of tension thereby to prevent stretching of the heated wire.

The first problem of temperature control is accomplished in each heating zone by employing a heating resistor with a main source of current and an auxiliary source of current. The main source of current is adjusted to maintain the resistor at just under the desired temperature and the auxiliary source of current is operated intermittently as required to maintain a slightly higher desired temperature. Operation of the auxiliary current source is controlled automatically in response to a sensing means in the form of a thermocouple that is located adjacent the heating element in position to receive direct radiation from the heating element. The positioning of the thermocouple in this manner makes the thermocouple highly sensitive to temperature changes of the heating element and reduces the time lag in the operation of the auxiliary current source.

The use of an auxiliary source to supply only a marginal portion of the necessary current combined with the use of a highly responsive thermocouple makes it possible to control the temperature of the heating zone within a range of variation on the order of 5° F. In contrast, the use of a thermocouple to control a single source of current with the thermocouple cut off from direct radiation of heat from the heating element would permit the temperature of the heating element to vary through a range as wide as 50° F.

As will be explained, the second problem of avoiding appreciable tension in the traveling wire is accomplished by providing a first wire-engaging means at the end of the processing path to pull the wire through the successive zones at a given rate and by further providing a second wire-engaging means near the entrance to the path for moving the wire at the same rate. In this regard, a feature of the invention is the concept of providing means to sense the differential between the two rates for close control of the second wire-engaging means.

The various features and advantages of the invention may be understood from the following detailed description and the accompanying drawings.

In the drawings, which are to be regarded as merely illustrative:

FIG. 1 is a somewhat diagrammatic side elevational view of the presently preferred embodiment of the apparatus for carrying out the process of applying a ceramic coating to a metal wire;

FIG. 2 is a transverse section taken as indicated by the line 2—2 of FIG. 1 showing how a thermocouple may be positioned in a heating zone to receive direct radiation from a heating element in the heating zone;

FIG. 3 is a fragmentary horizontal section taken as indicated at line 3—3 of FIG. 2 to show how the thermocouple may be positioned in a recess of the refractory material of the furnace, the recess being adjacent the longitudinal passage through which the wire travels;

FIG. 4 is a diagrammatic view showing how a heating element may comprise a series of three carbon rods assembled end to end;

FIG. 5 is a fragmentary elevational view showing the construction of the second wire-engaging means that is near the entrance to the processing path;

FIG. 6 is a plan view of the structure shown in FIG. 5 as shown along the line 6—6;

FIG. 7 is a sectional view of a power-actuated unit for coating the traveling wire with a suspension of finely divided ceramic material;

FIG. 8 is a perspective view of the upper roller in the unit shown in FIG. 7;

FIG. 9 is a perspective view of the lower roller shown in FIG. 7;

FIG. 10 is a perspective view of the rotary agitator shown in FIG. 7;

FIG. 11 is a wiring diagram of a control system that is used for regulating the temperature in each of the two heating zones;

FIG. 12 is a greatly enlarged schematic sectional view of the ceramic layer on the wire;

FIG. 13 is a greatly enlarged section along the line 13—13 of FIG. 12 showing how the ceramic layer fuses into the oxide film on the surface of the metal wire;

FIG. 14 is a view similar to FIG. 12 showing how the ceramic behaves on the outer side of a bend in the completed wire; and FIG. 15 is a similar view showing how the ceramic layer behaves on the inner side of a bend in the wire.

The principal parts of the apparatus shown in the side elevation in FIG. 1 include: a support structure in the form of an elevated metal framework 20 supported by vertical columns 22; a first furnace 24 on the framework, which furnace has a longitudinal passage 25 therethrough (FIGS. 2 and 3) for a traveling length of wire, the wire being indicated by the letter "W"; a first coating unit 26 to apply the ceramic mixture to the surface of the traveling wire before the wire enters the first furnace; a cooling unit 28 to cool the coated wire as it leaves the first furnace; a second furnace 30 similar to the first furnace and formed with a similar passage therethrough for the traveling wire; and a second coating unit 32 to apply a second coating of the ceramic mixture to the wire before the wire enters the second furnace 30.

The two furnaces 24 and 30 are of identical construction, each comprising essentially an elongated mass of refractory material. As best shown in FIG. 2, each of the two furnaces may be made in separate sections comprising refractory blocks which may be separated for access to the passage 25 through which the wire travels. In the construction shown the furnace comprises two longitudinal blocks of refractory material indicated 34 and 35, respectively. The refractory mass of each furnace is further provided with longitudinal bores 36 to house longitudinal heating elements 38 in the form of electrical resistors. In the construction shown there are four longitudinal bores 36, all at the same spacing from the longitudinal wire passage 25.

As indicated diagrammatically in FIG. 4, each of the heating elements 38 may comprise three resistor rods 38a, 38b, and 38c positioned end to end and connected to serve as a single resistor. The middle resistor rod 38b has the highest resistance to reach a higher temperature than the resistor rods 38a and 38c. Associated with the first furnace 24 is an indicating pyrometer 44 and associated with the second furnace 30 is a similar indicating pyrometer 45.

Preferably, the heating circuits for each of the two furnaces are identical and of the character indicated by the wiring diagram in FIG. 12. In FIG. 11, which relates to the first furnace 24, a main transformer is connected on its primary side to a pair of leads 48 from a suitable electromotive source and an auxiliary transformer 50 is connected on its primary side to an electromotive source by leads 52. The secondary coil 54 of the main transformer 46 and the secondary coil 55 of the auxiliary transformer 50 are connected together in series and are in series with an ammeter 56 and with the heating elements of the furnace which are represented by the resistor 38. Preferably, a potentiometer is provided for adjustment of the voltage developed by the main transformer 46. For this purpose a potentiometer resistor 58 interconnects the two terminals of the secondary coil 54. A wiper or brush 60 adjustable along the potentiometer resistor is connected to the secondary coil 55 of the auxiliary transformer 50.

The thermocouple 62 of the indicating pyrometer 44 of the furnace is connected both to the indicating pyrometer and to an amplifier 64. The output of the amplifier 64 is connected to a coil 65 of a relay 66 having a pair of contactors 68 to control the energization of the auxiliary transformer 50.

The potential that is required to energize the heating element 38 to the desired degree is approximately 30 volts. It has been found, however, that if a single transformer is employed to produce this voltage, there is considerable transient variation in the temperature produced in the furnace. The temperature may vary as much as 50° F., whereas the variation should be well within 10° F. The invention achieves the desired regulation by using the main transformer 46 to deliver 25 volts to the heating circuit and by energizing the auxiliary transformer to add 5 volts periodically as necessary. The thermocouple 62 senses the temperature in the furnace produced by the heating elements and causes the relay 66 to be operated intermittently as required. The indicating pyrometer 45 has an adjustable pointer 70 to indicate the temperature desired in the furnace, and has a second pointer 72 that is responsive to the thermocouple 62 to indicate the actual temperature in the furnace.

The thermocouple 62 may be mounted in the corresponding furnace in any suitable manner. In the present practice of the invention the thermocouple 62 is mounted in a recess 74 (FIG. 3) in the wall of the passage 35 through which the wire "W" travels. A small transverse passage 75 extends from the recess 74 to one of the heating elements 38 so that the thermocouple is exposed to direct radiation from the heating element for quick response to change in temperature of the heating element. It has been found that this arrangement in which the thermocouple "sees" one of the heating elements and in which the thermocouple controls only a marginal amount of voltage keeps the temperature within the desired range.

Each of the coating units 26 and 32 may be of the construction shown in FIGS. 7–11. The coating unit comprises a receptacle 76 for the coating mixture which is of the configuration of an upright cylinder with a peripheral wall 78 and a bottom wall 80. In the particular construction shown the bottom wall 80 is convex or conical in configuration. The traveling wire "W" passes through the receptacle diametrically thereof, the peripheral wall 78 being apertured for that purpose.

The coating material is a slip comprising an aqueous suspension of finely divided ceramic particles. Since the ceramic particles are of relatively high density, there is a strong tendency for the particles to settle and, moreover, if the mixture is permitted to stand with the particles settled, its viscosity increases with the passage of time.

Inside the coating receptacle the traveling wire "W" passes between a first or upper roller 82 and a second or lower roller 84, both of which rollers may advantageously be made of nylon. The upper roller 82 is secured by a pin 85 to an upper transverse shaft 86 that is journaled in suitable bearings 88. In like manner the lower roller 84 is secured by a pin 90 to a shaft 92 that is journaled in bearings 94 and is sealed by suitable O rings 95. The two rollers 82 and 84 have mutually contacting peripheral surfaces so that the lower roller continuously feeds the mixture to the upper roller. One of the rollers is grooved to receive the traveling wire and in the construction shown the upper roller 82 is provided with a circumferential groove 96 for this purpose.

As indicated in FIG. 7, the upper roller 82 may be generally cylindrical in configuration and the lower roller 84 may be generally spherical in configuration. In the construction shown the material of the lower roller 84 is cut away to form diametrical ribs 98 at its opposite ends which serve as agitator vanes when the roller is rotated while submerged in the coating mixture. In addition the lower roller 84 may be formed with a series of inclined bores 97 for further agitation of the mixture.

The space between the lower roller 84 and the bottom wall 80 of the coating receptacle is substantially completely occupied by an agitator member in the form of a rotary blade 100 that rotates on the axis of the receptacle. The upper edge 102 of the rotary blade 100 conforms to the profile of the roller 84 and the lower edge 104 conforms to the convex or conical configuration of the bottom wall 80 of the receptacle. It is apparent that the interior of the receptacle below the axis of the lower shaft 92 is completely taken up by the lower roller 84 and the rotary blade 100 so that there is no possibility of settling of the ceramic particles. As indicated in FIG. 10, preferably the opposite halves of the rotary blade 100 are suitably inclined relative to the direction of rotation of the rotary blade to have an upward propelling effect to urge the liquid suspension continuously against the underside of the lower roller 84.

Periodically, the coating receptacle is replenished to bring the liquid suspension up to the liquid level indicated by the dotted line 105. The liquid level may drop well below the lower shaft 92 with no effect on the manner in which the two cooperating rollers apply the mixture to the traveling wire.

A feature of the coating unit is the concept of the two rollers 82 and 84 rotating in opposite peripheral directions relative to the traveling wire, the lower periphery of the upper roller traveling in the direction of the wire and the upper periphery of the lower roller traveling in the opposite direction. By virtue of this arrangement the liquid mixture that follows the periphery of the lower roller meets head-on the material that follows the upper roller. It has been found that this action compensates for the tendency of the applied coating to be too thick on the underside of the wire and results in a coating of uniform thickness.

Any suitable means may be provided to drive the two rollers and the agitator blade 100. In the present arrangement the rotary agitator blade is mounted on a vertical shaft 106 which is equipped with an O ring 108 and is connected by a coupling member 110 with a motor 112 (FIG. 1). The lower transverse shaft 92 is connected by a coupling member 114 with a second motor 115. The opposite ends of the lower shaft 92 carry gears 116 outside of the coating receptacle and these gears mesh with corresponding pinions 118 that are mounted on corresponding spindles 120. The pinions 118 mesh in turn with corresponding gears 122 on the opposite ends of the upper shaft 86.

The coating receptacle is provided with a removable cover 124 that may be made of transparent plastic to permit convenient observation of the interior of the receptacle. The upper shaft 86 carrying the upper roller 82 is journaled in the cover 94 so that the upper roller 82 and the corresponding gears 122 are removed with the cover to make the interior of the receptacle fully accessible. With the cover 124 removed in this manner thumb screws 125 may be loosened to free the receptacle from a fixed support plate 126 and then the bottom 80 may be unscrewed and removed along with the agitator blade 100 to expose all of the interior surfaces and working parts for cleaning.

Preferably, a pair of spaced parallel guard plates 128 is positioned transversely of the traveling wire at each end of the two furnaces 24 and 30, respectively, each guard plate being suitably slotted to clear the traveling wire. The pairs of guard plates not only protect personnel by preventing accidental touching of the heating element 38 but also serve as shields to reduce the amount of radiated heat that reaches the two coating units 26 and 32 as well as the central cooling unit 28.

The cooling unit 28 may be omitted if provision is made for sufficiently exposing the coated wire to the atmosphere. The cooling unit 28 comprises a housing through which the wire travels, the housing being provided with a transverse passage 130 through which cooling air is propelled by a blower 132 with the air stream directed transversely across the traveling wire.

MECHANISM FOR DRIVING THE WIRE

It is apparent that the wire is driven along a predetermined processing path through five zones in sequence, namely: a first coating zone represented by the first coating unit 26; a first heating zone represented by the first furnace 24; a cooling zone represented by the cooling unit 28; a fourth zone where the wire is coated by the second coating unit 32; and a fifth zone which is the heating zone provided by the second furnace 30. It is essential that the wire be guided accurately through the successive zones at a constant rate.

Any appreciable tensioning of the wire is to be avoided since the wire is softened in the two heating zones to such an extent as to make it very susceptible to stretching. The problem of moving the wire along the processing path without tensioning the wire to any significant degree is solved by providing a first wire-engaging means at the end of the processing path to pull the wire through the five zones and by further providing a second wire-engaging means at the beginning of the processing path to avoid any significant resistance to the pulling force created by the first wire-engaging means.

The first wire-engaging means at the end of the processing path comprises a power-driven pick-up reel 140 in cooperation with a relatively large flanged wheel 142 and two smaller flanged wheels 144 and 145. Wire from the end of the processing path passes around approximately 180° of the large flanged wheel 142, then passes around 180° of the small flanged wheel 144 and returns to again pass around approximately 180° of the larger wheel 142. The larger wheel 142 is driven by an adjustable variable speed motor 143. The wire then passes under the small flanged wheel 145 and through a level wind mechanism to reach the pick-up reel 140. The level wind mechanism is of a familiar type, comprising a slotted member 146 through which the wire travels and a pair of parallel shafts 148. The slotted member 146 engages helical grooves in the two shafts 148 for reciprocation of the slotted member longitudinally of the two shafts.

The pick-up reel 140 is actuated by a variable speed torque motor 150. The torque motor 150 may be an induction motor, the voltage of which is controlled by a potentiometer 152 having an adjustment knob 154. The rate at which the wire is pulled along the processing path is determined by the adjustment of the variable speed motor 143 and the tension of the wire between the wheel 142 and the pick-up reel 140 is determined by the adjustment of the potentiometer 152.

The second wire-engaging means at the entrance to the processing path comprises a relatively large power-actuated flanged wheel 155 in combination with three smaller flanged guide wheels 156, 158, and 160, and a floating flanged wheel 162. This second wire-engaging means drives the wire from a supply reel 164 which is frictionally retarded in a well-known manner so that it turns only as fast as the wire is pulled by the second wire-engaging means.

The wire withdrawn from the supply reel 164 passes under the guide wheel 156, passes around approximately 350° of the circumference of the large wheel 155, and then passes under the guide wheel 158, over the guide wheel 160, and under the floating wheel 162 to pass upward over a relatively large guide wheel 165 at the beginning of the processing path. The large flanged wheel 155 is driven by a 2-speed motor 166 under the control of a normally open pressure-sensitive switch 168. In the absence of operation of the switch 168 the motor 166 drives the large flanged wheel 155 at a peripheral speed that is slightly under the speed at which the drive motor 143 pulls the wire. When the switch 168 is operated the motor speed is boosted to a rate to drive the wire at a higher rate than the wire is pulled by the pick-up reel 142.

The floating wheel 162 is carried by one arm of a lever 170 that pivots on a fulcrum 172. The second arm of the lever 170 is formed with an offset 174 for operation of the switch 168 and is further formed at its end with a hook to receive a counterweight 175. The counterweight 175 exactly balances the weight of the floating wheel 162. The floating wheel 162, however, is gravitationally-biased downwardly to a slight degree and for this purpose one or more small ring-shaped weights 176 may be placed on an upwardly extending pin on the lever 170.

By virtue of this arrangement the gravitationally-biased floating wheel 162 offsets the traveling wire to form a downwardly extending loop 180 in the wire. In effect, the loop 180 measures the slack in the wire and the behavior of the loop reflects the differential between the rate at which the wire is pulled by the pick-up reel of the first wire-engaging means and the rate at which the wire is propelled by the motor-driven flanged wheel 155 of the second wire-engaging means. Thus, the floating wheel 162 in sensing the changes in the slack of the wire senses the differential between the effective rates of the two respective wire-engaging means.

The wire along the processing path is engaged by a first pair of rollers 182 and 184 before the wire reaches the first coating unit 26. A second pair of rollers 185 and 186 engage the wire at the end of the first furnace 24. Finally, a third pair of rollers 188 and 190 engage the wire at the end of the second furnace 30.

The three pairs of rollers serve various purposes. The rollers support the traveling wire and are adjustable for precisely locating the path of travel of the wire. The three pairs of rollers provide three null points along the processing path to reduce the freedom for the traveling wire to vibrate. The first pair of rollers 182–184 and the last pair of rollers 188–190 slightly offset the wire to create slight but desirable local resistance that tends to keep the wire from sagging excessively in the runs between the successive pairs of rollers. The pair of rollers 185–186 also have the useful function of dissipating the heat of the traveling wire and these rollers may be made of aluminum for this purpose. Heat dissipation in this manner at the end of the first heating zone is important in the larger sizes of wire because of their greater tendency to retain heat.

OPERATION

The presently preferred ceramic mixture for coating the traveling wire consists largely of lead monosilicate, which is a mixture of lead oxide PbO and silicon dioxide $SiO_2$, the lead monosilicate being mixed with bismuth trioxide $Bi_2O_3$ and zinc oxide ZnO. The zinc oxide may be replaced by barium oxide, lanthium trioxide, magnesium oxide, or calcium oxide. The preferred proportions are:

| | Percent by weight |
|---|---|
| Lead oxide | 70 to 76 |
| Silicon dioxide | 10 to 14 |
| Bismuth trioxide | 10 |
| Zinc oxide | 5 |

These ingredients are mixed together in a finely divided state and are heated to a temperature on the order of 2100° F. to form a homogenous mass. The fused material is permitted to cool and is then ground to pass through a 400-mesh screen. The finely divided particles are then mixed with water.

The ceramic coating produced on a wire by this material provides good insulation at 1000° F. and, unlike ceramics that contain boron, is relatively immune to exposure by nuclear flux. A conventional ceramic of this character has a high content of silica and, therefore, is glassy and brittle. The present formula has a high lead content and a relatively small silica content, the lead giving the ceramic an important degree of flexibility and resilience.

In a typical operation of the described apparatus 26-gauge aluminum wire is coated with ceramic. The bare wire is found to measure 0.159 inch in diameter and the ceramic coating produces a final diameter of 0.168 inch. It has been found that aluminum wire generally has a film of aluminum oxide that is adequate for the purpose of the invention, the film being created by normal exposure of the wire to the atmosphere prior to the coating operation.

The variable speed drive motor 143 associated with the wheel 142 is adjusted to pull the wire along the processing path at a rate of approximately 12 feet per minute. The length of the central resistor rod 38b of the resistor 38 in each of the two furnaces 24 and 30 is approximately 7 inches, which may be considered as the dimension in length of each of the two heating zones. With the wire traveling at 12 feet per minute it is exposed to each of these heating zones for slightly under 3 seconds.

Each of the two furnaces is adjusted to maintain a temperature of 1510 to 1520° F. in the respective heating zone. At this adjustment approximately 14.6 amperes of current flow through each of the two heating circuits of the respective furnaces. It is to be noted that the melting point of the aluminum wire is 1220° F. and that each of the heating zones is approximately 300° F. above the melting point of the metal of the wire. The wire travels so fast through the two heating zones, however, that the metal of the wire approaches but does not reach its melting point.

The tension weight 176 that is selected in this instance to give the floating wheel 162 the desired gravitational bias weighs 30 grams. This downward bias of the floating wheel 162 is sufficient to take up slack in the traveling wire but is not large enough to place the wire under any significant amount of tension. When the motor 166 operates at its low speed the peripheral speed of the large flanged wheel 155 is slightly less than 12 feet per minute with the result that the downwardly hanging loop of wire 180 which is engaged by the floating wheel 162 progressively shortens to elevate the floating wheel. The progressive elevation of the floating wheel 162 causes the offset 174 in the lever 170 to close the switch 168 to increase the peripheral speed of the large flanged wheel 155 to more than 12 feet per minute. At this increased speed the wire loop 180 lengthens with consequent lowering of the floating wheel 162 until the switch 168 opens to slow down the motor 166. Thus, the motor 166 is intermittently run at the higher speed as required to continuously feed the wire to the processing path without placing the wire under tension.

It is important to note that the wire is in contact with 10° less than the full circumference of the large flanged wheel 155 and that the two small flanged wheels 156 and 158 are offset from each other, as shown in FIG. 6, for free movement of the wire around the flanged wheel. There is a certain regulating effect inherent in this arrangement in that any tendency of the wire to loosen around the large wheel 155 results in slippage of the wire relative to the wheel. Thus, when the wire tends to tighten around the wheel in reaction to the lifting of the floating wheel 162, the wheel effectively engages the wire to increase the rate at which the wire is fed to the floating wheel. On the other hand, the wire around the flanged wheel 155 tends to loosen when the floating wheel 162 moves downward and consequently the frictional engagement of the wheel with the wire is lessened to cause the wire to slip relative to the wheel.

While the wire may be coated in a single operation, it is advantageous to coat and fire the traveling wire twice. Repeating the coating operation results in a ceramic layer of the desired thickness and also lessens the internal stresses in the finished ceramic. Repeating the coating operation is also desirable to insure that the wire is completely covered by the ceramic.

As heretofore noted, three factors are involved in the successful coating of the traveling wire with ceramic, and make it possible for the first time to apply a ceramic coating to aluminum wire. In the first place, the ceramic coating is bonded to an oxide film that is, in turn, tenaciously adherent to the wire. In the second place, there is an additional physical or mechanical bond between the ceramic and the metal of the wire. In the third place, the ceramic coating is of nodular character. These three factors may be appreciated by referring to FIGS. 11 to 15.

In FIGS. 12–15 the metal of the wire is indicated by reference numeral 192 and the ceramic coating is indicated by reference numeral 194. The profile of the roughness of the metal surface is somewhat exaggerated to emphasize the fact that there are numerous minute irregular recesses in the surface of the metal into which portions of the ceramic penetrate.

With reference to the first factor, FIG. 13 shows on a greatly enlarged scale the aluminum oxide film 195 on the surface of the aluminum wire. When the coated traveling wire is fired in the correct manner the ceramic 194 penetrates or fuses into the oxide film 195, as indicated by the relatively large arrows in FIG. 13 and, on the other hand, the oxide film fuses into the ceramic as indicated by the small arrows. The mutual fusion involves complex chemical reactions and changes the composition of both the ceramic and the oxide film, the final result being tenacious chemical bonding of the ceramic to the oxide film. Since the oxide film is tenaciously adherent to the metal 192, the result is that the ceramic layer is bonded to the metal.

The importance of close temperature control may be appreciated when it is considered that underfiring the traveling wire results in insufficient mutual fusion between the ceramic and the oxide film and consequent failure of the ceramic to bond to the wire. On the other hand, overfiring with excessive penetration of the ceramic into the oxide film causes the oxide film to disappear into the ceramic with consequent failure of the ceramic to bond to the metal. In most instances the temperature range between failure by reason of underfiring and failure by reason of overfiring is approximately 10° F.

The second factor depends on the fact that the metal of the wire has a greater coefficient of thermal expansion than the ceramic. When the ceramic and the metal of the wire cool together, the minute recesses in the surface of the metal contract faster than the ceramic to engage the corresponding portions of the ceramic in a positive manner. It is this contraction of the metal recesses that results in the mechanical or physical bond between the metal and the ceramic.

The third factor is the production of a ceramic layer of nodular character, the ceramic layer being characterized by minute nodules or knobs 196. When the ceramic is heated to a certain degree, depending on the particular ceramic mixture, maximum surface tension is developed to cause the rounded nodules 196 to form. The required surface tension is not created if the temperature of the ceramic is either too low or too high. Fortuitously, the nodular configuration of the ceramic may be achieved within the range of temperature and the duration of the heating step that are required for the desired degree of fusion between the ceramic and the oxide film. In practice, it is a relatively simple matter to vary the speed of travel of the wire and the temperature in the two heating zones until the desired adjustment is found by trial and error.

The importance of the nodular configuration of the ceramic layer may be appreciated by considering FIGS. 14 and 15. When the wire is bent to a radius the nodules 196 tend to separate and fan out on the outside of the curve, as indicated in FIG. 14. The nodules tend to separate or diverge because the least resistance to cleavage is at the junctures of the nodules 196 and the fractures tend to occur radially largely because of the combined effectiveness of the physical and chemical bonding of the inner portion of the ceramic to the metal.

FIG. 15 shows how the nodules 196 tend to converge and crowd together on the inner side of the curvature of the wire. Because of the high lead content of the ceramic there is a certain degree of resiliency in the nodules 196 which permits slight lateral compression of the nodules. In addition, the ceramic material pulverizes and drops away from the surfaces of mutual pressure contact between contiguous nodules for reduction in the width of the nodules as required to accommodate the inside curve of the wire.

Because of the described behaviour of the ceramic coating under flexure of the wire, the finished wire may be wound on a mandrel of a diameter as small as five times the diameter of the wire without destroying the protective ceramic coating. If the wire is subsequently straightened out, the divergent gaps shown in FIG. 14 close together and similar gaps develop between the nodules shown in FIG. 15, the protective and insulating effectiveness of the ceramic coating being maintained.

If a nickel wire is to be coated with ceramic, the nickel wire is first processed for the creation of the required oxide film 195. For this purpose the bare nickel wire may be run through the two furnaces 24 and 30 with the two coating units 26 and 32 removed. With the temperature of the heating zones adjusted at approximately 1700° F., a satisfactory oxide film will be formed on the wire at the usual speed of travel of the wire. The coating operation is then carried out in substantially the same manner as heretofore described in detail, but at a higher temperature.

It is to be noted that the heating of the nickel wire is far under the melting point, the melting point of nickel being approximately 2651° F. Since it is the surface metal that is important, the process may be used for wire of any metal if the wire is clad with aluminum or nickel. If nickel-clad copper wire is used, the temperature in the two heating zones far exceeds the melting point of copper but the duration of exposure of the wire to the heating zone is insufficient to cause the copper to reach its melting point.

My description in specific detail of the selected practices of the invention will suggest various changes, substitutions and other departures from my disclosure within the spirit and scope of the appended claims.

I claim:

1. A method of coating an oxide-coated wire with a ceramic material, characterized by the steps of: passing the wire longitudinally between an upper roller and a lower roller with the lower roller partially submerged in the ceramic material; rotating the lower roller to move its upper periphery counter to the direction of wire travel; simultaneously rotating the upper roller to move its periphery in the direction of wire travel whereby the lower roller supplies the ceramic material to the upper roller and both rollers apply the mixture to the traveling wire with the direction of application of the material to the wire by the lower roller opposing the direction of application of the ceramic material to the wire by the upper roller with consequent substantially uniform depositing of the ceramic material on the traveling wire.

2. A method of fabricating a ceramic-coated wire, characterized by the steps of: selecting a wire with a surface metal capable of forming a tenaciously adherent oxide of the metal; exposing said wire to oxygen under conditions to cause the surface of the wire to be covered with a film of the oxide; encasing the wire with a layer of uniform thickness of a fluid mixture of oxides capable of fusing into a ceramic; providing a heating zone to cause said coating to fuse into a ceramic and to fuse the ceramic to said film; engaging the ceramic-coated wire to pull it through said heating zone; and applying propelling force to the bare wire before it is coated to substantially keep the wire from being stretched in said heating zone.

3. A method of continuously processing an oxide-coated bare wire from a supply reel to form a ceramic coating on the wire, characterized by the steps of:
leading the wire through a first zone and a second zone;
passing the wire longitudinally in said first zone between an upper roller and a lower roller with the lower roller partially submerged in the ceramic coating material;
rotating the lower roller to move its upper periphery counter to the direction of wire travel;
simultaneously rotating the upper roller to move its periphery in the direction of wire travel whereby the lower roller supplies the ceramic material to the upper roller and both rollers apply the mixture to the traveling wire with the direction of application of the material to the wire by the lower roller opposing the direction of application of the ceramic material to the wire by the upper roller with consequent substantially uniform depositing of the ceramic material on the traveling wire;
heating the wire in the second zone to harden the coating;
applying a constant pulling force to the hard coated wire beyond the second zone to pull the wire through the two zones at a constant rate;
forming the wire into a loop before the first zone;
applying a force to said loop in a direction to tend to elongate the loop thereby providing a constant resistance to said pulling force to maintain the wire under a sufficiently low tension to inhibit the wire from stretching; and
feeding the wire to the loop at a rate to maintain the loop.

4. A method of continuously processing an oxide-coated bare wire from a supply reel to form a ceramic coating on the wire, characterized by the steps of:
leading the wire through a first zone and a second zone;
passing the wire longitudinally in said first zone between an upper roller and a lower roller with the lower roller partially submerged in the ceramic coating material;
rotating the lower roller to move its upper periphery counter to the direction of wire travel;
simultaneously rotating the upper roller to move its periphery in the direction of wire travel whereby the lower roller supplies the ceramic material to the upper roller and both rollers apply the mixture to the traveling wire with the direction of application of the material to the wire by the lower roller opposing the direction of application of the ceramic material to the wire by the upper roller with consequent substantially uniform depositing of the ceramic material on the traveling wire;
heating the wire in the second zone to harden the coating;
applying pulling force to the hard coated wire beyond said second zone to tension the wire for a movement of the wire in the second zone without support; and
applying pushing force to the bare wire before said first zone to compensate at least in part for the resistance to unwinding of the wire from said reel and thus keep the tension in the wire in the second zone relatively low to avoid substantial stretching of the heated wire in the second zone.

5. A method of processing a reel of oxide-coated bare wire to produce a coated wire, characterized by the steps of:
leading the wire from the reel through a first zone and a second zone;
coating the wire with a ceramic mixture in the first zone;
heating the coated wire to harden the coating in the second zone;
supporting the bare wire at a first point before the first zone and at a second point beyond the second zone;
applying pulling force to the hard coated wire beyond the second zone to tension the wire sufficiently to cause the wire to travel between the two points without support; and
applying pushing force to the bare wire at said first point to compensate at least in part for the resistance to unwinding of the wire from the reel and thus keep the tension in the wire in the heating zone relatively low to avoid substantial stretching of the heated wire.

6. A method of continuously processing an oxide-coated bare wire to form a ceramic coating on the wire, characterized by the steps of:
leading the wire through a first zone;
tensioning the wire during the movement of the wire through the first zone;
disposing the ceramic material in the first zone;
applying forces against the ceramic material at contiguous positions in the direction of movement of the wire through the first zone and in the opposite direction during the movement of the wire through the first zone to apply a substantially uniform coating to the periphery of the wire; and
heating the wire to bond the ceramic coating to the wire after the movement of the wire through the first zone.

7. The method set forth in claim 6 wherein the ceramic material is agitated during the movement of the wire through the first zone to facilitate the uniform coating of the ceramic material on the periphery of the wire and wherein the wire is heated to fuse the ceramic coating to the wire after the movement of the wire through the first zone.

8. A method of continuously processing an oxide-coated bare wire to form a ceramic coating on the wire, characterized by the steps of:
continuously leading the wire through a first zone;
maintaining a particular tension on the wire during the movement of the wire through the first zone;
disposing particles of the ceramic material in the first zone in a liquid suspension;
applying a first force against the suspension of the ceramic particles in a direction corresponding to the direction of movement of the wire and downwardly in a direction transverse to the direction of movement of the wire at the trailing end of the wire in the direction of movement of the wire and applying a second force at a position contiguous to the first force and in a direction opposite to the direction of movement of the wire and upwardly at the trailing end of the wire in a direction transverse to the direction of movement of the wire to obtain a uniform coating of the ceramic material around the periphery of the wire; and heating the wire to bond the ceramic coating to the wire after the movement of the wire through the first zone.

9. The method set forth in claim 8 wherein the particles of the ceramic material in the suspension are continuously agitated during the movement of the wire through the first zone.

10. The method set forth in claim 9 wherein the wire is led through the first zone at a substantially constant rate and wherein the wire is maintained at a particular tension to inhibit any stretching of the wire.

11. The method set forth in claim 10 wherein the particles of the ceramic material in the liquid suspension are continuously agitated to maintain a uniform disposition of the particles in the suspension.

12. A method of continuously processing an oxide-coated bare wire to form a ceramic coating on the wire, characterized by the steps of:

applying a tension to the wire of a sufficient magnitude to move the wire in a particular direction through a first zone without stretching the wire;

disposing particles of the ceramic material in the first zone in a liquid suspension and in the path of the wire;

applying a first force against the particles of the ceramic material in a direction having a component corresponding to the direction of movement of the wire through the first zone and having a further component aiding gravity at the trailing end of the wire in the direction of movement of the wire and applying a second force against the particles of the ceramic material at a position contiguous to the application of the first force and in a direction having a component opposite to the direction of the wire through the first zone and having a further component opposing gravity at the trailing end of the wire in the direction of movement of the wire to obtain a uniform coating of the particles of the ceramic material around the periphery of the wire; and heating the ceramic coated wire to a particular temperature after the movement of the wire through the first zone to fuse the ceramic material to the wire.

References Cited by the Examiner

UNITED STATES PATENTS

| | | | |
|---|---|---|---|
| 1,271,320 | 7/1918 | Housekeeper | 117—128 X |
| 1,316,018 | 9/1919 | Cooke | 148—6 |
| 1,522,265 | 1/1925 | Peacock | 117—128 X |
| 1,580,890 | 4/1926 | Herman | 118—68 |
| 1,722,079 | 7/1929 | Elmen | 148—156 X |
| 1,802,892 | 4/1931 | Hansen | 13—22 |
| 1,926,363 | 9/1933 | Bergstein | 118—117 X |
| 1,957,942 | 5/1934 | Convers. | |
| 2,015,424 | 9/1935 | Forst | 148—6 |
| 2,068,330 | 1/1937 | Jessup | 118—68 |
| 2,114,802 | 4/1938 | Kinzel | 148—31.5 |
| 2,176,582 | 10/1939 | Cook | 148—156 X |
| 2,218,177 | 10/1940 | Powell | 13—22 |
| 2,219,780 | 10/1940 | Jominy | 148—31.5 |
| 2,289,862 | 7/1942 | Bailey | 117—128 |
| 2,317,114 | 4/1943 | Rosenberg | 148—6 |
| 2,354,123 | 7/1944 | Horstman et al. | 148—6 |
| 2,421,719 | 6/1947 | Simmons | 148—6.3 XR |
| 2,547,047 | 4/1951 | Saums et al. | 117—231 |
| 2,589,283 | 3/1952 | O'Grady | 148—156 X |
| 2,848,794 | 8/1958 | Roth | 117—231 |
| 2,879,185 | 3/1959 | King et al. | 106—49 XR |
| 2,933,417 | 4/1960 | McIntyre et al. | 117—111 |
| 2,975,078 | 3/1961 | Rayfield | 117—129 XR |
| 3,011,913 | 12/1961 | Pierce et al. | 117—111 |

FOREIGN PATENTS 336,710  10/1930  Great Britain.

RICHARD D. NEVIUS, *Primary Examiner.*

RAY K. WINDHAM, MARCUS U. LYONS, *Examiners.*